United States Patent
Hull et al.

(10) Patent No.: US 9,165,231 B2
(45) Date of Patent: Oct. 20, 2015

(54) IMAGE RECOGNITION IN PASSIVE RFID DEVICES

(75) Inventors: Jonathan J. Hull, San Carlos, CA (US); Kathrin Berkner, Los Altos, CA (US); Sergey Chemishkian, San Jose, CA (US); Xu Liu, Cupertino, CA (US); Sapna A. Shroff, Menlo Park, CA (US)

(73) Assignee: Ricoh Company, Ltd., Tokyo (JP)

( * ) Notice: Subject to any disclaimer, the term of this patent is extended or adjusted under 35 U.S.C. 154(b) by 430 days.

(21) Appl. No.: 13/216,732

(22) Filed: Aug. 24, 2011

(65) Prior Publication Data

US 2013/0049926 A1 Feb. 28, 2013

(51) Int. Cl.
| | |
|---|---|
| *G05B 23/02* | (2006.01) |
| *H04N 7/18* | (2006.01) |
| *G06K 19/07* | (2006.01) |
| *G06T 7/00* | (2006.01) |
| *G06F 3/042* | (2006.01) |
| *G06K 19/077* | (2006.01) |
| *G06K 17/00* | (2006.01) |

(52) U.S. Cl.
CPC .......... *G06K 19/0716* (2013.01); *G06F 3/0425* (2013.01); *G06K 19/0718* (2013.01); *G06K 19/07701* (2013.01); *G06T 7/004* (2013.01); *G06K 2017/0045* (2013.01)

(58) Field of Classification Search
CPC ............. G06F 3/0425; G06K 19/0711; G06K 19/07701; G06K 19/0718; G06K 7/0004; G06K 9/00013; G06K 2017/0045; G07C 9/00087; G07C 9/00119; G08B 13/19608

USPC ........ 340/3.1, 5.52, 5.53, 5.61, 5.7, 5.8, 5.81, 340/5.82, 5.83, 10.1, 10.42, 436, 571, 340/572.1, 573.1; 348/77, 135, 143, 161, 348/E07.085; 382/115, 118, 124, 181; 701/469

See application file for complete search history.

(56) References Cited

U.S. PATENT DOCUMENTS

| | | | | |
|---|---|---|---|---|
| 5,833,603 | A * | 11/1998 | Kovacs et al. | 600/317 |
| 6,988,071 | B1 * | 1/2006 | Gazdzinski | 704/275 |
| 7,659,823 | B1 * | 2/2010 | Killian et al. | 340/572.4 |
| 2003/0104848 | A1 * | 6/2003 | Brideglall | 455/574 |
| 2004/0061324 | A1 * | 4/2004 | Howard | 283/69 |
| 2004/0239481 | A1 * | 12/2004 | Beenau et al. | 340/5.53 |
| 2005/0207624 | A1 * | 9/2005 | Ehlers et al. | 382/124 |
| 2006/0164686 | A1 * | 7/2006 | Nakagawa | 358/1.18 |
| 2007/0103303 | A1 * | 5/2007 | Shoarinejad | 340/572.1 |
| 2007/0109121 | A1 * | 5/2007 | Cohen | 340/539.26 |
| 2008/0028230 | A1 * | 1/2008 | Shatford | 713/186 |
| 2008/0204198 | A1 * | 8/2008 | Qi | 340/10.1 |
| 2008/0230615 | A1 * | 9/2008 | Read et al. | 235/492 |
| 2008/0306756 | A1 * | 12/2008 | Sorensen et al. | 705/1 |
| 2009/0102296 | A1 * | 4/2009 | Greene et al. | 307/149 |

(Continued)

*Primary Examiner* — Benjamin C Lee
*Assistant Examiner* — Stephen Burgdorf
(74) *Attorney, Agent, or Firm* — Duft Bornsen & Fettig LLP (57) ABSTRACT

Passive RFID devices are disclosed that perform image recognition. The device includes an antenna, circuitry, and a camera. The antenna receives a radio frequency (RF) signal from a RFID reader. The circuitry stores image data for objects that is used for image recognition. To operate, the circuitry derives power from the RF signal. With the power derived from the RF signal, the camera captures an image. The circuitry then identifies an object in the captured image based on the image data for the objects, and outputs information for the identified object, such as to the RFID reader.

20 Claims, 6 Drawing Sheets

(56) References Cited

U.S. PATENT DOCUMENTS

| | | | |
|---|---|---|---|
| 2009/0195384 A1* | 8/2009 | Amidi | 340/568.1 |
| 2009/0322477 A1* | 12/2009 | Celorio | 340/5.82 |
| 2010/0038428 A1* | 2/2010 | Chen et al. | 235/462.25 |
| 2011/0241833 A1* | 10/2011 | Martin et al. | 340/10.1 |
| 2012/0127289 A1* | 5/2012 | Kim et al. | 348/61 |
| 2012/0200389 A1* | 8/2012 | Solomon | 340/5.52 |
| 2012/0218079 A1* | 8/2012 | Kim | 340/5.83 |
| 2012/0329386 A1* | 12/2012 | Reyner | 455/41.1 |
| 2013/0022274 A1* | 1/2013 | Lawrence Ashok Inigo et al. | 382/195 |
| 2014/0257562 A1* | 9/2014 | Lee et al. | 700/255 |

* cited by examiner

IMAGE RECOGNITION IN PASSIVE RFID DEVICES

FIELD OF THE INVENTION

The invention relates to the field of passive Radio Frequency Identification (RFID) devices and, in particular, to passive RFID devices that are able to perform image recognition.

BACKGROUND

Radio Frequency Identification (RFID) refers to a process of transferring data over a Radio Frequency (RF) signal between a reader and a device that is attached to an item. RFID is commonly used for identifying and tracking items. For example, RFID devices may be attached to items in a warehouse so that inventory in the warehouse may be tracked. The RFID device, also referred to as a RFID tag, typically stores an identifier (ID) for an item in memory. The RFID device reads the item ID from the memory, and broadcasts a RF signal that includes the item ID (e.g., the item ID is modulated on the RF signal). An RFID reader receives the RF signal and interprets the item ID from the RF signal.

Most RFID devices include an antenna that receives and transmits RF signals, and an integrated circuit that stores data and processes the RF signals. Some RFID devices also include a battery, and are referred to as active devices. Other RFID devices do not include a battery, and are referred to as passive devices. In a passive RFID device, the power for the integrated circuit is supplied by a RF signal transmitted by the RFID reader. The antenna in the passive RFID device receives the RF signal from the RFID reader. The antenna has a coiled configuration which causes the RF signal to form an electromagnetic field in the antenna. The integrated circuit derives power from the electromagnetic field, which energizes the integrated circuit instead of a battery or some other power source. With the power supplied by the RF signal, the integrated circuit reads the data stored in memory, and modulates the stored data onto the RF signal. The antenna then transmits or reflects the modulated RF signal for reception by the RFID reader. The RFID reader senses the RF signal from the passive RFID device, and processes the data added to the RF signal.

SUMMARY

Embodiments described herein provide for an improved passive RFID device that performs image recognition. Image recognition refers to the process of identifying an object in a digital image. The passive RFID device includes an on-board camera. The camera captures an image, and the passive RFID device recognizes an object in the captured image based on image data that is preloaded on the passive RFID device. For example, the passive RFID device may recognize a person's face in a captured image based on image data that is preloaded on the passive RFID device. This type of passive RFID device with recognition capabilities may be used in many different applications.

In one embodiment, the passive RFID device includes an antenna, circuitry, and a camera. The circuitry stores image data for objects that is used for image recognition. For example, the image data may be for human faces, fingerprints, bar codes, etc. When in operation, the antenna in the passive RFID device receives a radio frequency (RF) signal from a RFID reader, and the circuitry derives power from the RF signal. With the power derived from the RF signal, the camera captures an image (e.g., takes a digital picture). The circuitry then identifies an object in the captured image based on the image data for the objects. For example, the circuitry may compare the captured image to the image data for each of the objects as stored in the circuitry (e.g., memory). If the captured image matches the image data for one of the objects, then the circuitry detects the presence of the corresponding object in the captured image. The circuitry may then output information for the identified object to the RFID reader or another system.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF THE EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
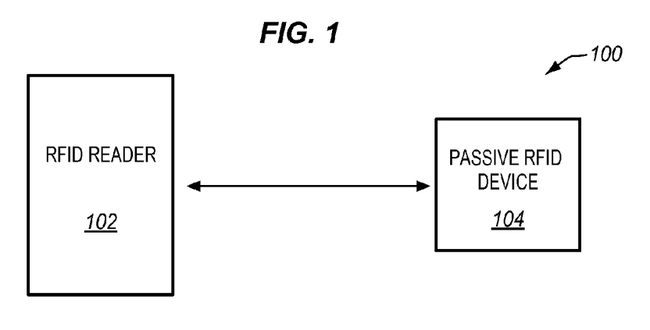
FIG. 1 is a block diagram illustrating a RFID system in an exemplary embodiment.

FIG. 1 is a block diagram illustrating a RFID system 100 in an exemplary embodiment. RFID system 100 includes a RFID reader 102 and a passive RFID device 104. RFID reader 102 is an active device that reads data from RFID device 104. RFID reader 102 transmits RF signals, and receives modulated RF signals back from RFID device 104 that include the data stored on RFID device 104. RFID reader 102 may then process the data from RFID device 104, and share the data with other systems, such as over a network.

RFID device 104 is a passive device, meaning that it derives power from RF signals received from RFID reader 102 instead of from an active power source, such as a battery. In the embodiments described herein, RFID device 104 is equipped with a camera that captures an image. RFID device 104 is able to recognize one or more objects that are present in the captured image, and report back information about the recognized object(s) to RFID reader 102.

Figure 2:
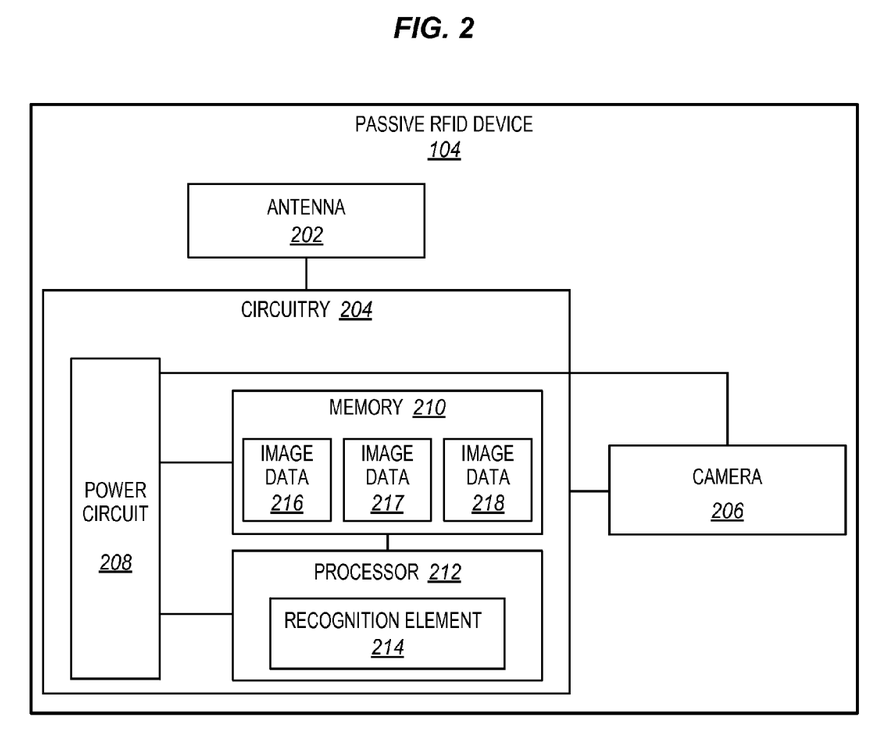
FIG. 2 is a block diagram of a passive RFID device in an exemplary embodiment.

FIG. 2 is a block diagram of RFID device 104 in an exemplary embodiment. RFID device 104 includes an antenna 202, circuitry 204, and a camera 206. Antenna 202 is operable to transmit and receive RF signals. Circuitry 204 includes a power circuit 208, memory 210, and a processor 212. Power circuit 208 is operable to derive power from a RF signal received from RFID reader 102 through antenna 202. The power derived from power circuit 208 energizes circuitry 204 and camera 206, instead of power from a battery or some other active power source, which makes RFID device 104 a passive device. Memory 210 is operable to store data and other programs or commands executable by processor 212. In this embodiment, memory 210 also stores image data 216-218 for objects (one or more). For example, memory 210 may store image data for bar codes, human faces, fingerprints, eyes, etc. The image data stored in memory 210 is used for image recognition, which means that the image data provides characteristics, features, landmarks, etc., of an object so that the object may be recognized in an image (e.g., a digital picture) that is captured by camera 206.

Processor 212 is programmable to provide the desired functionality of RFID device 104. One of the functions provided by processor 212 is to report data that is stored in memory 210. Another one of the functions provided by processor 212 is to recognize one or more objects that are present in an image captured by camera 206. The recognition functionality in RFID device 104 is provided by a recognition element 214 within processor 212. Recognition element 214, as shown in FIG. 2, represents the function or logic in RFID device 104 for recognizing one or more objects that are present in an image captured by camera 206. Recognition element 214 may be an algorithm that extracts distinguishing features (or characteristics, landmarks, etc.) from a captured image, and compares the distinguishing features to the image data for the objects stored in memory 210. For example, if the object in the captured image is a human face, then the algorithm may analyze the position, size, and/or shape of the eyes, nose, cheekbones, jaw, etc., and compare these features to image data for the objects stored in memory 210. If the features in the captured image match the image data for one of the objects, then the algorithm detects the presence of the corresponding object in the captured image. Alternatively, if the object is a machine readable code, such as a bar code (e.g., a matrix bar code such as a Quick Response (QR) code), then the algorithm may determine the relative x-y position of features in the machine readable code and derive the digital data represented by that configuration of features.

Figure 3:
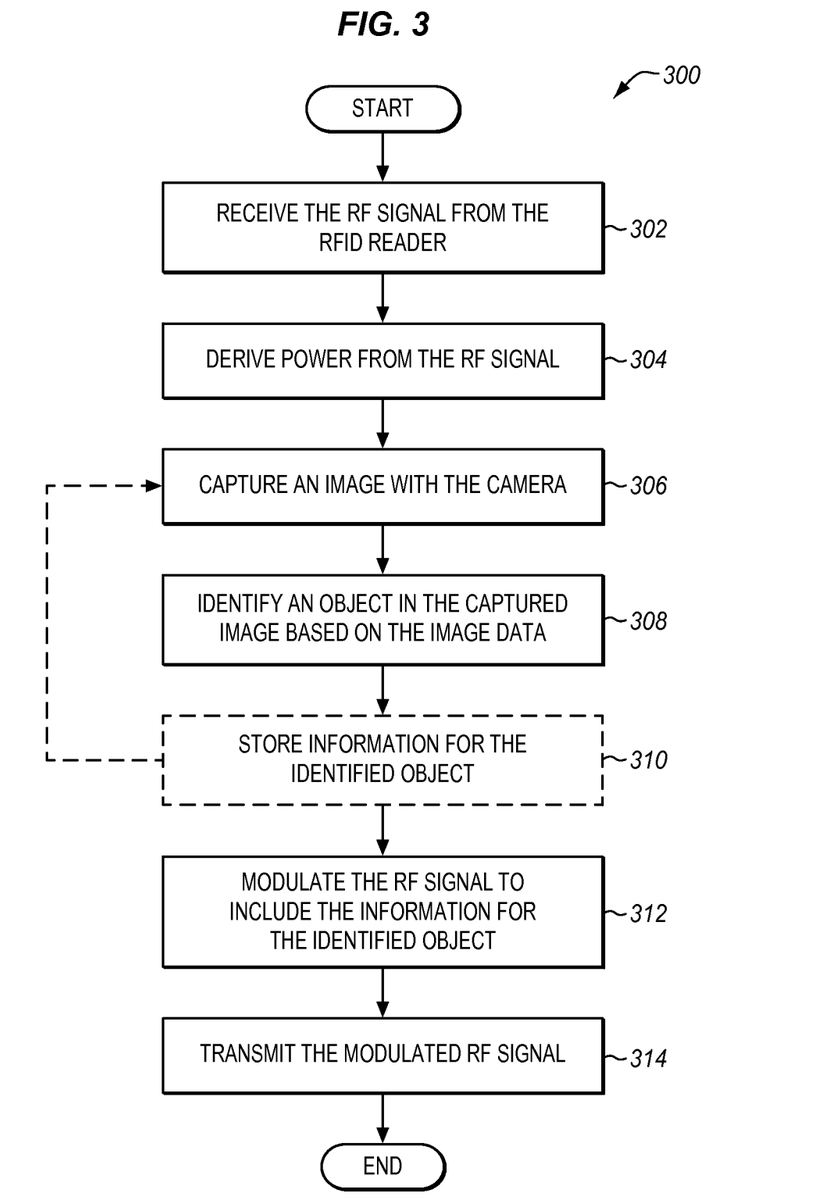
FIG. 3 is a flow chart illustrating a method of operating a RFID device to perform image recognition in an exemplary embodiment.

Assume in FIG. 1 that RFID reader 102 transmits a RF signal while RFID device 104 is proximate to RFID reader 102. FIG. 3 is a flow chart illustrating a method 300 of operating RFID device 104 to perform image recognition in an exemplary embodiment. The steps of method 300 will be described with respect to RFID device 104 of FIGS. 1-2, although one skilled in the art will understand that the methods described herein may be performed by other devices not shown. The steps of the methods described herein are not all inclusive and may include other steps not shown. The steps for the flow chart shown herein may also be performed in an alternative order.

In step 302, antenna 202 receives the RF signal from RFID reader 102. In step 304, power circuit 208 derives power from the RF signal. For example, antenna 202 may have a coiled configuration which causes the RF signal to form an electromagnetic field in antenna 202. Power circuit 208 may then derive the power from the electromagnetic field, which energizes circuitry 204 and camera 206.

With the power derived from the RF signal, camera 206 captures an image in step 306. To do so, camera 206 takes a digital picture, and forwards the digital picture to circuitry 204 as the captured image. Also with the power derived from the RF signal, recognition element 214 identifies or recognizes (in step 308) an object (or objects) in the captured image based on the image data that is stored in memory 210. For example, recognition element 214 may compare the captured image (or distinguishing features in the captured image) to the image data for each of the objects as stored in memory 210. If the captured image matches the image data for one of the objects, then recognition element 214 detects the presence of the corresponding object in the captured image. When an object is detected in the captured image, recognition element 214 may optionally store (step 310) information for the identified object in memory 208, such as a name, an ID, etc., for the object. Alternatively, the recognition element 214 may apply a recognition algorithm that derives the digital data embedded in the captured image, and optionally store the digital data in memory 208.

Steps 306-310 may be repeated one or more times depending on how circuitry 204 is programmed. For example, if recognition element 214 fails to detect an object in a captured image in step 308, then camera 206 may capture another image (step 306) and recognition element 214 will again attempt to identify an object in the new image (step 308). This process may repeat multiple times to allow recognition element 214 to identify an object in one of the images captured by camera 206. Also, circuitry 204 may be programmed to process multiple captured images in succession. For example, recognition element 214 may attempt to identify an object in a first image that is captured by camera 206. If an object is identified in the first image, then recognition element 214 stores information for the identified object. Recognition element 214 may then attempt to identify an object in a second image that is captured by camera 206. If an object is identified in the second image, then recognition element 214 stores information for the identified object. Recognition element 214 may repeat this process to identify objects in multiple images that are captured by camera 206, and store information for the identified objects.

At some point, RFID device 104 will output the information for the identified object(s). RFID device 104 may output the information for the identified object(s) to RFID reader 102 in response to a request, at periodic times, etc. To output the information, processor 212 reads the information for the identified object from memory 210, and modulates the RF signal to include the information in step 312. Antenna 202 then transmits the modulated RF signal in step 314 for reception by RFID reader 102. Antenna 202 may be able to actively transmit the modulated RF signal based on power derived from power circuit 208. Antenna 202 may alternatively reflect or backscatter the RF signal that is received from RFID reader 102 after it is modulated. Either way, the modulated RF signal is transmitted for reception by RFID reader 102.

RFID device 104 may alternatively output the information for the identified object(s) to other systems. For example, RFID device 104 may be equipped for network communications, such as IEEE 802.15.4, Zigbee, IEEE 802.11, or other types of network communication.

RFID device 104 may also trigger another action upon identification of an object. For example, RFID device 104 may illuminate an LED or sound a buzzer when it recognizes a particular object.

The information for the identified object may vary depending on desired implementations. The information may include an ID for the object, such as a name, a number, a code, etc., that indicates the identity of the object. For example, if the object includes a human, then the information for the human may include a name, an employee number, etc. The information may include digital data that is detected in a captured image, such as digital data embedded in a machine readable code, such as a bar code. The information may include all or part of the captured image of the object.

Regardless of the content of the information, circuitry 204 may output the information as one or more tag IDs that are understood by RFID reader 102. In a typical RFID system, a RFID tag stores a tag ID that is reported to a RFID reader when the reader is in range. The tag ID may have a conventional size, such as 16 bits. Also, the RFID tag typically outputs the tag ID in a particular format (e.g., synchronization bits, start bits, tag ID, stop bits) that is understood by the RFID reader. In one embodiment, circuitry 204 outputs the information for the identified object in the format of a typical tag ID so that RFID reader 102 may receive and process the information in a conventional manner. Therefore, RFID reader 102 does not need to be enhanced or reprogrammed in order to receive the information for the identified object from RFID device 104.

The RFID device 104 described above provides many advantages. For one, the camera 206 in RFID device 104 is powered by the RF signal so that an active power source is not needed for camera 206 to operate. Also, the image recognition functionality of RFID device 104 has a variety of applications. For example, RFID device 104 may track its own location by recognizing objects in known locations. In another example, RFID device 104 may be integrated into user-specific applications by automatically recognizing the user of a device, such as a computer, a vehicle, etc.

EXAMPLES

Figure 4:
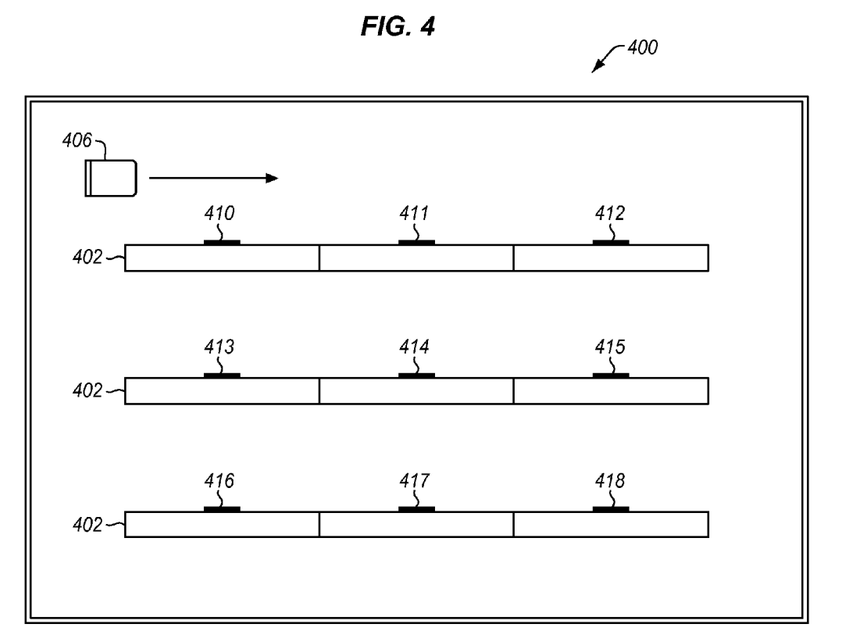
FIG. 4 is a top view of a warehouse in an exemplary embodiment.
Figure 5:
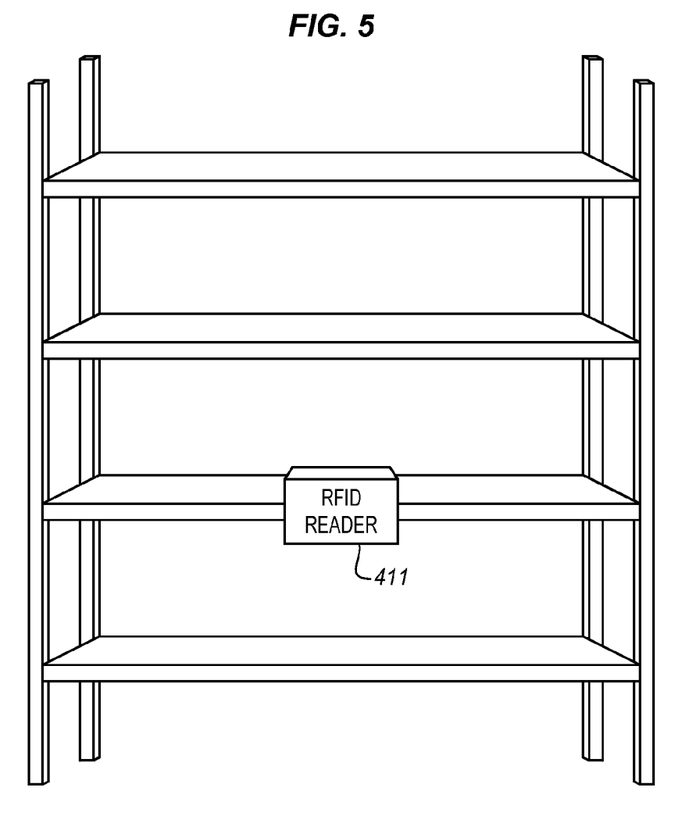
FIG. 5 illustrates a shelving unit with a RFID reader installed in an exemplary embodiment.
Figure 6:
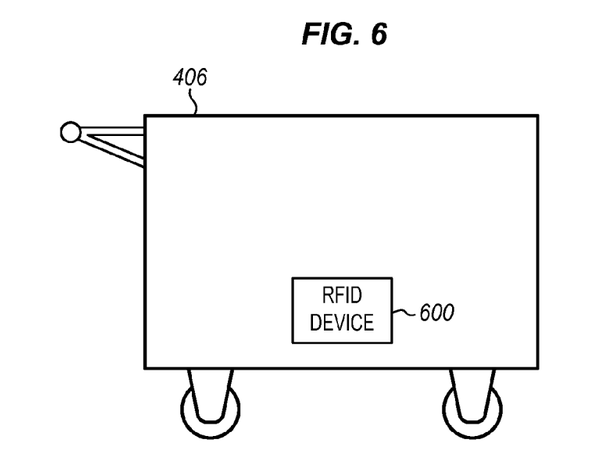
FIG. 6 illustrates a cart with an attached passive RFID device in an exemplary embodiment.

The examples described below illustrate the passive RFID device described above being used in different applications. FIGS. 4-8 illustrate an application of the passive RFID device to track location in an exemplary embodiment. The passive RFID device is able to self-track by detecting objects at known locations within a warehouse. FIG. 4 is a top view of a warehouse 400 in an exemplary embodiment. Warehouse 400 includes rows 402 of shelving units, where RFID readers 410-418 are installed on the shelving units at known locations. FIG. 5 illustrates a shelving unit with a RFID reader 411 installed. A passive RFID device is attached to a cart 406 that is used in warehouse 400. FIG. 6 illustrates cart 406 with an attached passive RFID device 600. Each of the RFID readers 410-418 has a unique bar code imprinted on a surface that faces passive RFID device 600 as cart 406 travels between the rows 402 of shelving units. The bar code identifies the location of the RFID reader. Passive RFID device 600 is thus able to track its own location using image recognition.

Figure 7:
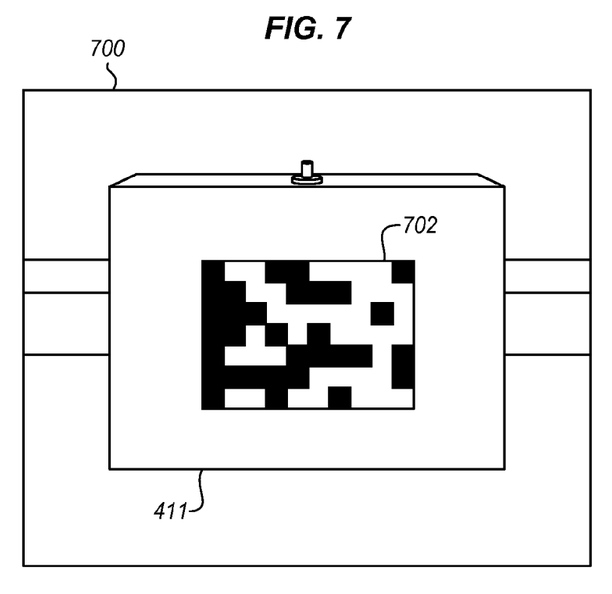
FIG. 7 illustrates an image captured by a camera in a passive RFID device in an exemplary embodiment.

In order to provide image recognition, passive RFID device 600 includes a recognition algorithm that can derive digital data from images of each of the unique bar codes of RFID readers 410-418. RFID device 600 also has a camera installed that is able to take digital pictures. Assume for this example that cart 406 travels proximate to RFID reader 411, which is transmitting a RF signal. When this occurs, passive RFID device 600 receives the RF signal, and derives power from the RF signal. With the power derived from the RF signal, the camera in passive RFID device 600 captures an image. FIG. 7 illustrates the image 700 captured by the camera in passive RFID device 600. Image 700 shows RFID reader 411 with its unique data matrix bar code 702. Passive RFID device 600 then executes the bar code recognition algorithm on the captured image. In this example, passive RFID device 600 identifies the bar code 702 for RFID reader 411 in the captured image 700. Passive RFID device 600 then stores information for the identified bar code 702 (or information for RFID reader 411).

Figure 8:
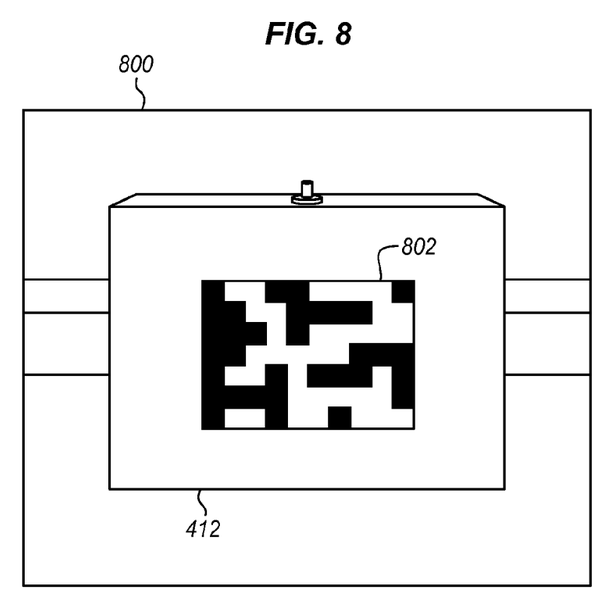
FIG. 8 illustrates an image captured by a camera in a passive RFID device in an exemplary embodiment.

Cart 406 then travels proximate to RFID reader 412, which is also transmitting a RF signal. Passive RFID device 600 derives power from the RF signal provided by RFID reader 412. With the power derived from the RF signal, the camera in passive RFID device 600 captures an image. FIG. 8 illustrates the image 800 captured by the camera in passive RFID device 600. Image 800 shows RFID reader 412 with its unique data matrix bar code 802. Passive RFID device 600 then executes the bar code recognition algorithm on the captured image. In this example, passive RFID device 600 identifies the bar code 802 for RFID reader 412 in the captured image 800. Passive RFID device 600 then stores information for the identified bar code 802 (or information for RFID reader 412).

At some point, the information stored in passive RFID device 600 is read by one of the RFID readers 410-418. Passive RFID device 600 receives a RF signal from the RFID reader (one of readers 410-418), and reads the information for the identified bar codes from memory. Passive RFID device 600 then modulates the RF signal to include the information for the identified bar codes, and transmits the modulated RF signal for reception by the RFID reader. Based on the bar codes that were recognized by passive RFID device 600, the location for cart 406 may be tracked over a time period as cart 406 travels through warehouse 400. For example, a controller (not shown) may process the information for the identified bar codes (e.g., bar code IDs) reported by passive RFID device 600. The bar codes, which are imprinted on the RFID readers 410-418, are at known locations within warehouse 400. By processing the identified bar codes that were detected by passive RFID device 600, the controller is able to determine that cart 406 travelled by these known locations within warehouse 400. If a date/time is included with the bar code information detected by passive RFID device 600, then the controller is also able to determine when cart 406 was at each of the known locations.

Figure 9:
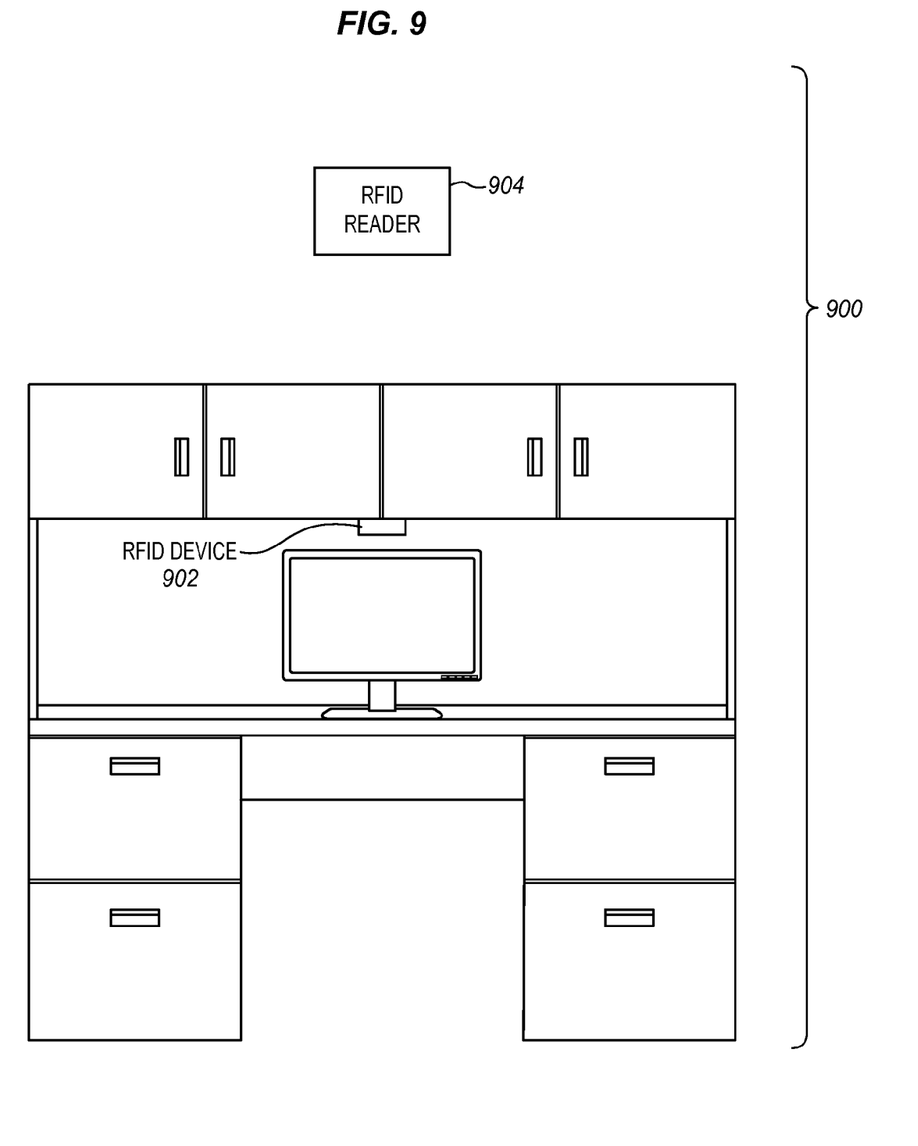
FIG. 9 illustrates an office in an exemplary embodiment.

Another exemplary application of a passive RFID device is for controlling environmental conditions, such as in an office. FIG. 9 illustrates an office 900 having a desk, a computer, etc. A user of office 900 may have customized settings for light level, temperature, sound, or other environmental conditions. In order to have the customized settings automatically adjusted when a user enters office 900, a passive RFID device 902 is installed in office 900 that is able to recognize the user of office 900. A RFID reader 904 is also installed within range of passive RFID device 902, such as in the ceiling of office 900.

In order to recognize users of office 900, passive RFID device 902 is programmed with image data for each of the potential users of office 900. Like the other example, passive RFID device 902 has a camera installed that is able to take digital pictures. Assume for this example that a user enters office 900 and sits in front of passive RFID device 902. Passive RFID device 902 receives a RF signal from RFID reader 904, and derives power from the RF signal. With the power derived from the RF signal, the camera in passive RFID device 902 captures an image. Passive RFID device 902 then compares the captured image to the image data for the potential users of office 900. If the image data for one of the potential users matches the captured image, then passive RFID device 902 identifies the present user of office 900. Passive RFID device 902 modulates the RF signal to include an ID for the identified user, and transmits the modulated RF signal for reception by RFID reader 904. RFID reader 904 may then forward the user ID to a controller (not shown). The controller may adjust the light level, temperature, sound, etc., to the customized settings of the identified user.

Although specific embodiments were described herein, the scope of the invention is not limited to those specific embodiments. The scope of the invention is defined by the following claims and any equivalents thereof.

We claim:

1. An apparatus comprising:
   a Radio Frequency Identification (RFID) device that includes:
      an antenna configured to receive Radio Frequency (RF) signals from RFID readers:
      circuitry configured to store image data associated with the RFID readers that are at known locations: and
      a camera connected to the circuitry;
      the circuitry configured to derive power from the RF signals;
      with the power derived from the RF signals:
         the camera is configured to take a digital picture each time the RFID device passes proximate to one of the RFID readers;
         the circuitry is configured to compare the image data associated with the RFID readers to the digital pictures, to recognize identifiers for the RFID readers in the digital pictures, and to store the identifiers for the RFID readers recognized in the digital pictures; and
         the circuitry is configured to output the identifiers for the RFID readers recognized in the digital pictures through a network communication to another system other than the RFID readers.

2. The apparatus of claim 1 wherein:
the network communication comprises IEEE 802.15.

3. The apparatus of claim 1 wherein:
the network communication comprises IEEE 802.11.

4. The apparatus of claim 1 wherein:
the circuitry is configured to sound a buzzer responsive to recognizing the identifiers for the RFID readers in the digital pictures.

5. The apparatus of claim 1 wherein:
the circuitry is configured to illuminate a Light Emitting Diode (LED) responsive to recognizing the identifiers for the RFID readers in the digital pictures.

6. The apparatus of claim 1 wherein:
the circuitry is configured to store times that the identifiers for the RFID readers were recognized in the digital pictures.

7. The apparatus of claim 1 wherein:
the image data is for machine readable codes imprinted on surfaces of the RFID readers that face the RFID device; wherein a machine readable code indicates a known location of a corresponding RFID reader.

8. The apparatus of claim 7 wherein:
the machine readable codes include a Quick Response (QR) code.

9. A method of operating a passive Radio Frequency Identification (RFID) device, the method comprising:
storing, in the RFID device, image data associated with RFID readers that are at known locations:
receiving Radio Frequency (RF) signals in the RFID device from the RFID readers; and
deriving power from the RF signals;
with the power derived from the RF signals, the method further includes:
   taking a digital picture with a camera installed on the RFID device each time the RFID device passes proximate to one of the RFID readers;
   comparing the image data associated with the RFID readers to the digital pictures;
   recognizing identifiers for the RFID readers in the digital pictures;
   storing the identifiers for the RFID readers recognized in the digital pictures within the RFID device; and
   outputting the identifiers for the RFID readers recognized in the digital pictures through a network communication to another system other than the RFID readers.

10. The method of claim 9 wherein:
the network communication comprises IEEE 802.15.

11. The method of claim 9 wherein:
the network communication comprises IEEE 802.11.

12. The method of claim 9 further comprising:
sounding a buzzer responsive to recognizing the identifiers for the RFID readers in the digital pictures object in the digital picture.

13. The method of claim 9 further comprising:
illuminating a Light Emitting Diode (LED) responsive to recognizing the identifiers for the RFID readers in the digital pictures.

14. The method of claim 9 further comprising:
storing times that the identifiers for the RFID readers were recognized in the digital pictures.

15. The method of claim 9 wherein:
the image data is for machine readable codes imprinted on surfaces of the RFID readers that face the RFID device; wherein a machine readable code indicates a known location of a corresponding RFID reader.

16. The method of claim 15 wherein:
the machine readable codes include a Quick Response (QR) code.

17. A system comprising:
a plurality of Radio Frequency Identification (RFID) readers at known locations each having a machine readable code imprinted on a surface:
a RFID device that includes:
   an antenna configured to receive Radio Frequency (RF) signals from the RFID readers;
   circuitry configured to store image data for the machine readable codes associated with the RFID readers; and
   a camera connected to the circuitry;
   the circuitry configured to derive power from the RF signals;
   with the power derived from the RF signals:
      the camera is configured to take a digital picture each time the RFID device passes proximate to one of the RFID readers; and
      the circuitry is configured to compare the image data for the machine readable codes associated with the RFID readers to the digital pictures, to recognize the machine readable codes in the digital pictures which correspond with the RFID readers, and to store the machine readable codes for the RFID readers recognized in the digital pictures.

18. The system of claim 17 wherein:
the circuitry is configured to sound a buzzer responsive to recognizing the machine readable codes in the digital pictures.

19. The system of claim 17 wherein:
the circuitry is configured to output information for the machine readable codes recognized in the digital pictures by modulating a received RF signal to include the information; and
the antenna is configured to transmit the modulated RF signal for reception by one of the RFID readers.

20. The system of claim 17 wherein:
the circuitry is configured to output information for the machine readable codes recognized in the digital pictures through a network communication to another system other than the RFID readers.

* * * * *